Patented Aug. 5, 1941

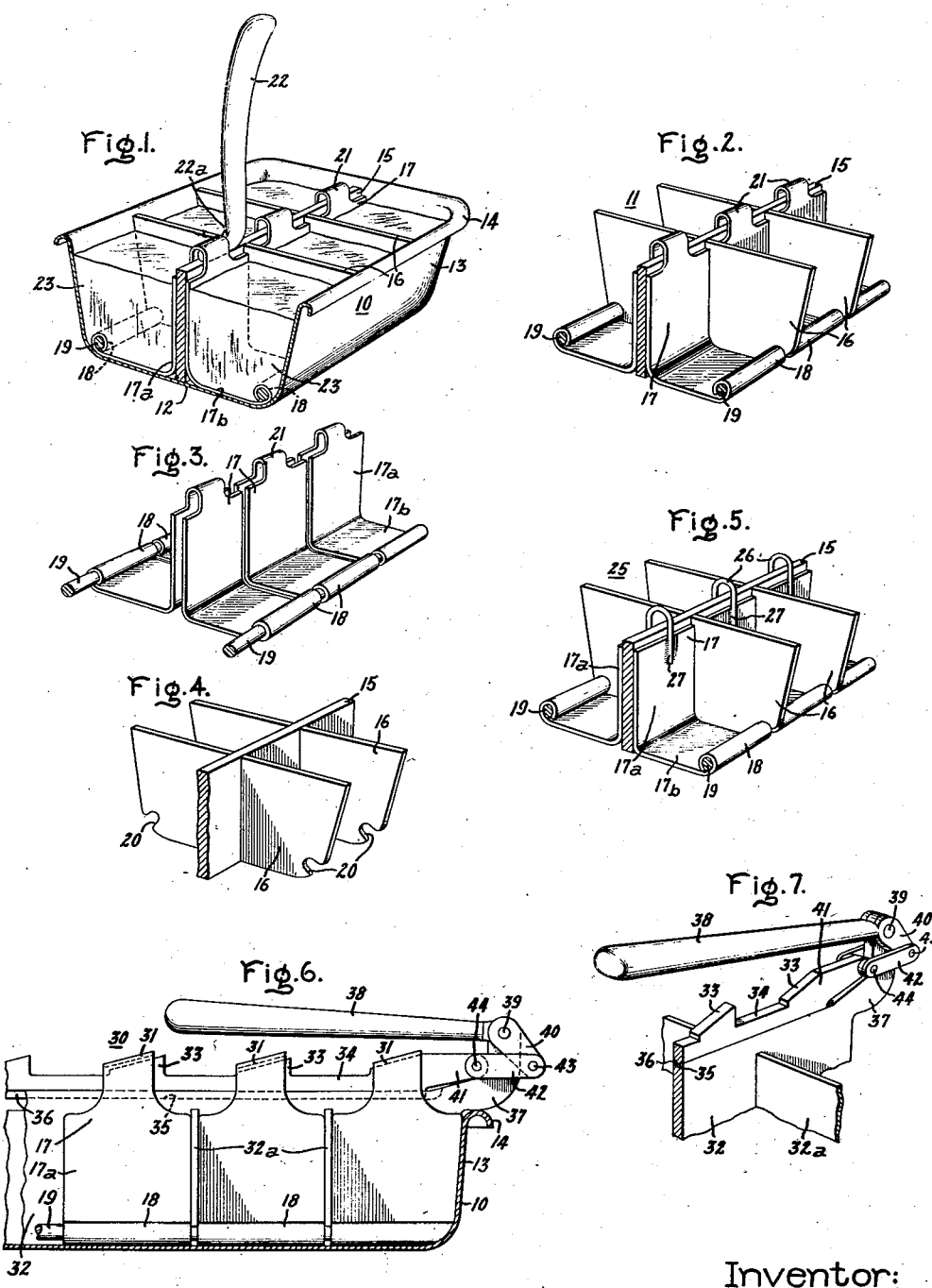

2,251,628

UNITED STATES PATENT OFFICE 2,251,628

FREEZING TRAY

Larry D. Kelly, Scotia, N. Y., assignor to General Electric Company, a corporation of New York Application June 8, 1937, Serial No. 147,057

7 Claims. (Cl. 62—108.5)

My invention relates to freezing trays employed in refrigerating machines for producing ice blocks and to a method of mechanically releasing the ice blocks from the freezing trays.

Many types of refrigerating machines, and particularly those adapted for household use, are provided with a freezing tray supported on a surface of a cooling unit associated with the refrigerating machine for producing ice. A divider is commonly provided in the freezing tray in order to divide the same into a number of small compartments so that the ice will be frozen in the form of small blocks or cubes. The divider is frequently separate from the freezing tray and removable therefrom in order to facilitate the release of the ice blocks.

Arrangements have been proposed for mechanically releasing the divider and the ice blocks carried thereby from the freezing tray and for mechanically releasing the ice blocks from the divider without thawing the frozen bonds between the ice blocks and the refrigerating apparatus. These arrangements have not been altogether satisfactory, due in part, to the fact that all of the ice blocks are released substantially simultaneously from the freezing tray and the divider, thereby requiring relatively great operating forces.

An object of my invention is to provide an improved arrangement for greatly diminishing the forces required to release mechanically ice blocks from a freezing tray without thawing the frozen bonds between the ice blocks and their compartment walls.

Another object of my invention is to provide a freezing tray, a divider cooperating with the freezing tray to form a plurality of ice block compartments, and an improved arrangement for mechanically releasing the ice blocks from the freezing tray and the divider without thawing the frozen bonds between the ice blocks and their compartment walls.

A further object of my invention is to provide a freezing tray, a divider cooperating with the freezing tray to form a plurality of ice block compartments, and an arrangement for mechanically releasing at least one of the ice blocks disposed in one of the compartments from the freezing tray and the divider without disturbing the frozen bonds between other of the ice blocks and their compartment walls.

Another object of my invention is to provide a freezing tray having a divider cooperating therewith to form a plurality of adjacent pairs of ice block compartments, and an arrangement for, and a method of, mechanically releasing each pair of the ice blocks from the freezing tray and the adjacent pairs of ice blocks in a predetermined order from the freezing tray and the divider without thawing the frozen bonds between the ice blocks and their compartment walls.

Further objects and advantages of my invention will become apparent as the following description proceeds, and the features of novelty which characterize my invention will be pointed out with particularity in the claims annexed to and forming a part of this specification.

For a better understanding of my invention reference may be had to the accompanying drawing in which Fig. 1 is a fragmentary perspective view of a freezing tray and a removable divider forming a plurality of adjacent pairs of ice block compartments, and embodying my invention; Fig. 2 is a fragmentary perspective view of the divider showing the parts thereof; Fig. 3 is a fragmentary perspective view of a plurality of relatively movable partition elements forming a part of the divider shown in Fig. 2; Fig. 4 is a fragmentary perspective view of a plurality of partition walls forming a part of the divider shown in Fig. 2; Fig. 5 is a fragmentary perspective view of a modified form of the divider; Fig. 6 is a fragmentary side elevational view, partly in section, of a modified form of a freezing tray having a divider forming ice block compartments, and a manually operable arrangement for mechanically releasing the adjacent pairs of ice blocks from their compartment walls in a predetermined order; and Fig. 7 is a fragmentary perspective view of the manually operable arrangement shown in Fig. 6.

Referring to the drawing, in Fig. 1 I have shown a shallow rectangular freezing tray 10 and a removable divider 11. The freezing tray 10 is provided with a substantially flat bottom wall 12 and an upwardly directed marginal wall 13 which is provided with a downwardly turned marginal rim 14 adjacent the upper edge thereof. The divider 11 includes a longitudinal partition wall 15 and a plurality of transverse partition walls 16 cooperating with the freezing tray 10 to form a plurality of adjacent pairs of ice block compartments extending transversely of the divider and arranged in juxtaposed relation longitudinally of the divider. A flexible L-shaped partition element 17 is arranged in each of the ice block compartments and comprises a vertical wall portion 17a conforming to a side of the longitudinal partition wall 15 and a horizontal wall portion 17b conforming to the bottom wall 12 of the freezing tray 10. The outer ends of the horizontal portions 17b of the partition elements 17 are rolled over at 18, and a pair of rods 19 extend through the rolled-over portions 18 to connect the outer ends of the horizontal portions 17b of the partition elements 17 to the lower edges of the transverse partition walls 16. The transverse partition walls 16 are provided with recesses 20 therein adapted to receive portions of the rods 19 extending across the lower edges thereof. Also, a connecting strap 21 extends between the upper edges of the vertical portions 17a of each pair of the partition elements 17 arranged in adjacent ice block compartments on opposite sides of the longitudinal partition wall 15. Preferably, the adjacent pair of partition elements 17 and the connecting strap 21 extending therebetween are formed integrally from a single sheet of flexible metal. Each of the connecting straps 21 extends across the longitudinal partition wall 15. These connecting straps are spaced therefrom in order to receive the end of a lever 22 including a curved end 22a for mechanically releasing a pair of the ice blocks 23 disposed in a pair of the adjacent ice block compartments.

The pair of rods 19 extending through the rolled-over portions 18 adjacent the outer ends of the horizontal portions 17b of the partition elements 17 together with the connecting straps extending between the upper edges of the vertical portions 17a of each pair of the partition elements 17 retain the partition elements 17 in assembled relation on the divider 11 and provide for relative movement of each pair of the connected partition elements 17 with respect to the freezing tray 10 and the partition walls 15 and 16 of the divider 11. The assembled partition elements 17 shown in Fig. 3 may be readily placed upon the assembled partition walls 15 and 16 shown in Fig. 4 in order to provide the divider 11 shown in Fig. 2, by placing the assembled partition elements 17 over the assembled partition walls 15 and 16, spreading the rods 19 apart, lowering the partition element 17 into the ice block compartments formed by the partition walls 15 and 16, and engaging the portions of the rods 19 disposed between the rolled-over portions 18 with the recesses 20 formed in the lower edges of the transverse partition walls 16. The divider 11 is retained in assembled relation due to the resiliency of the flexible partition elements 17. The assembled partition elements 17 may be removed from the partition walls 16 by following the steps set forth above in an inverse order, in order to facilitate cleaning of the component parts of the divider 11.

The adjacent pairs of ice blocks 23 are mechanically released from the freezing tray 10 and the divider 11 in a predetermined order and, preferably, the adjacent pairs of ice blocks are released from the freezing tray 10 and the divider 11 successively from the front end of the trays toward the rear end thereof. This arrangement provides for mechanically releasing any desired pair of ice blocks without thawing, and without disturbing the frozen bond between the remaining ice blocks and their containing walls. In releasing a pair of the ice blocks from the ice block compartments the curved end 22a of the lever 22 is inserted between the connecting strap 21 extending between the upper edges of the vertical portions 17a of a pair of the partition elements 17 arranged in adjacent ice block compartments on opposite sides of the longitudinal partition wall 15. The outer end of the lever 22 is then depressed causing the curved end 22a thereof to fulcrum on the upper edge of the longitudinal partition wall 15 and exert an upward lifting force between the connecting strap 21 and the upper edge of the longitudinal partition wall 15 which tends to straighten the connected pair of L-shaped partition elements 17. The vertical portions 17a of the connected pair of partition elements 17 are raised slightly within the ice block compartments and with respect to the partition walls 15 and 16 and the bottom wall 12 of the freezing tray 10, which causes the rolled-over portions 18 on the outer ends of the horizontal portion 17b of the connected pair of partition elements 17 to turn slightly about the pair of rods 19. These movements of the horizontal and vertical portions of the connected pair of partition elements 17 produce lifting forces acting upon the pair of ice blocks 23 being released, which shifts the pair of ice blocks upwardly and outwardly toward the marginal rim 14 of the freezing tray 10. The pair of ice blocks 23 is thus shifted away from the longitudinal partition wall 15 and the frozen bonds between the ice blocks 23 and the freezing tray and divider are broken without thawing. Any desired number of pairs of ice blocks 23 are preferably released by the lever 22 from the freezing tray 10 and the divider 11 successively from the front end of the freezing tray toward the rear end thereof. The released ice blocks 23 may then be removed for use as desired without disturbing any other blocks.

In Fig. 5 I have shown a modified form of divider 25 of substantially the same construction as the divider 11 shown in Fig. 2. In this form of the construction the partition elements 17 are individually formed and the adjacent partition elements 17 of each pair are secured together by a connecting strap 26 comprising an inverted U-shaped steel wire, the ends of the connecting straps 26 being welded at 27 to the upper edges of the vertical portions 17a of the partition elements 17. If desired, the connecting straps 26 may be formed of plural strand steel cable in order to lend additional flexibility thereto.

Figs. 6 and 7 illustrate a freezing tray 10 of the construction shown in Fig. 1, a slightly modified form of divider 30, and an arrangement for mechanically releasing adjacent pairs of the ice blocks from the freezing tray 10 and the divider 30 successively from the front end of the freezing tray toward the rear end thereof without thawing. In this construction pairs of the partition elements 17 are connected by straps 31. Each of the connecting straps 31 extends across the longitudinal partition wall 32 and is slightly inclined toward the rear end of the divider 30 in order to engage one of a plurality of tapered wedges 33 provided on a slide 34 carried by the upper edge of the longitudinal partition wall 32. The tapered wedges 33 are of the same height above the edge of the slide. The upper edge of the longitudinal partition wall 32 extends somewhat above the upper edges of the transverse partition walls 32a and is provided with a groove 35 therein, which receives a tongue 36 formed on the lower edge of the slide 34. Also, the longitudinal partition wall 32 is provided with an upwardly extending integral arm 37 adjacent the front end of the divider 30 and extending over the front edge of the downwardly turned marginal rim 14 of the freezing tray 10. An operating handle 38 is pivotally mounted on the upper end of the arm 37 by a pin 39 extending through aligned holes formed in the operating handle 38 adjacent one end thereof and in the upper end of the arm 37. The operating handle 38 is provided with a pair of arms 40 disposed on opposite sides of the arm 37 which are operatively connected to an extension 41 on the slide 34 adjacent the front end of the divider 30, by an arrangement including a pair of links 42 disposed on opposite sides of the arm 37. The links 42 are pivoted to the arms 40 and the extension 41 by a pair of pins 43 and 44, respectively, extending through holes provided in the ends of the links, the ends of the arms 40 and the end of the extension 41.

The operating handle 38 normally occupies a substantially horizontal position and is swingable from its normal position to a substantially vertical position about the pin 39. As the operating handle 38 is swung into its vertical position the slide 34 is moved from its normal position adjacent the front end of the divider 30 toward the rear end thereof. The longitudinal spacings between the tapered wedges 33 on the slide 34 successively decrease from the front end of the divider 30 toward the rear end thereof. As a result, when the operating handle 34 is swung from its horizontal position to its vertical position, the tapered wedges 33 which are of equal height above the slide 34, successively engage the connecting straps 31 from the front end of the divider 30 toward the rear end thereof. Thus, as the operating handle 38 is swung into its vertical position, the adjacent pairs of partition elements 17 are successively lifted within the ice block compartments and with respect to the freezing tray 10 and to the partition walls 32 and 16 of the divider from the front end of the freezing tray 10 toward the rear end thereof. This causes the adjacent pairs of ice blocks to be released from the freezing tray and the divider successively from one end of the freezing tray toward the other end thereof. Any desired number of pairs or all of the ice blocks may be released from the freezing tray 10 and the divider 30 by swinging the operating handle 38 about its pivot 39 from its horizontal position to an appropriate inclined position toward its vertical position. The released ice blocks may then be removed from the freezing tray 10 and the divider 30 for use as desired.

While I have shown and described certain embodiments of my invention, other modifications will be apparent to those skilled in the art. I therefore do not desire my invention to be limited to the particular arrangements shown and described, and I intend in the appended claims to cover all modifications within the spirit and scope of my invention.

What I claim as new and desire to secure by Letters Patent of the United States, is:

1. In combination with a freezing tray having a bottom wall, a divider comprising a plurality of partition walls cooperating with said freezing tray to form ice block compartments, a partition element arranged in one of said compartments, said partition element having a portion conforming to one of said partition walls and another portion conforming to the bottom wall of said freezing tray, and manually operable means adapted to exert a force upon said partition element for breaking loose an ice block disposed in said one compartment from at least one of its compartment walls.

2. In combination with a freezing tray having a bottom wall, a divider comprising a plurality of partition walls and cooperating with said freezing tray to form ice block compartments, a partition element arranged in one of said compartments, said partition element having a portion conforming to one of said partition walls and another portion conforming to the bottom wall of said freezing tray, and manually operable means adapted to exert a force between said divider and said partition element for breaking loose an ice block disposed in said one compartment from at least one of its compartment walls.

3. In combination with a freezing tray having a bottom wall, a divider comprising a plurality of partition walls cooperating with said freezing tray to form ice block compartments, a flexible partition element arranged in one of said compartments, said partition element having a vertical portion conforming to one of said partition walls and a horizontal portion conforming to the bottom wall of said freezing tray, and manually operable means adapted to exert a force on said partition element tending to straighten said partition element for breaking loose an ice block disposed in said one compartment from its compartment walls.

4. In combination with a freezing tray having a bottom wall, a divider comprising a plurality of partition walls cooperating with said freezing tray to form ice block compartments, a flexible partition element arranged in one of said compartments, said partition element having a vertical portion conforming to one of said partition walls and a horizontal portion conforming to the bottom wall of said freezing tray, the outer end of said horizontal portion of said partition element being connected to the lower portion of said divider, and manually operable means adapted to exert a lifting force on said partition element tending to straighten said partition element for breaking loose an ice block disposed in said one compartment from its compartment walls.

5. In combination with a freezing tray having a bottom wall, a divider comprising a plurality of partition walls and cooperating with said freezing tray to form ice block compartments, a flexible L-shaped partition element arranged in each of two adjacent compartments, said partition elements having vertical portions conforming to the sides of one of said partition walls and horizontal portions conforming to the bottom wall of said freezing tray, means extending between the vertical portions of said partition elements and across said one partition wall for connecting said partition elements, and manually operable means adapted to exert a force upon said connecting means tending to straighten said partition elements for breaking loose ice blocks disposed in said adjacent compartments from their compartment walls.

6. In combination with a freezing tray having a bottom wall, a divider comprising a plurality of partition walls cooperating with said freezing tray to form ice block compartments, a flexible L-shaped partition element arranged in each of two adjacent compartments, said partition elements having vertical portions conforming to the sides of one of said partition walls and horizontal portions conforming to the bottom wall of said freezing tray, means extending between the vertical portions of said partition elements and across said one partition wall for connecting said partition elements, the outer ends of the horizontal portions of said partition elements being connected to the lower portion of said divider, and manually operable means adapted to exert a lifting force between said divider and said connecting means tending to straighten said partition elements for breaking loose ice blocks disposed in said adjacent compartments from their compartment walls.

7. In combination with a freezing tray having a bottom wall, a divider comprising a longitudinal partition wall and plurality of transverse partition walls and cooperating with said freezing tray to form a plurality of ice block compartments, a flexible L-shaped partition element arranged in each of said compartments, each of said partition elements having a vertical portion conforming to a side of said longitudinal partition wall and a horizontal portion conforming to the bottom wall of said freezing tray, means extending between the vertical portions of each pair of said partition elements in adjacent compartments on opposite sides of said longitudinal partition wall and across said longitudinal partition wall for connecting said partition elements, means including a pair of spaced apart rods extending along the lower portion of said divider for connecting the outer ends of said horizontal portions of said partition elements to said divider, and manually operable means adapted to exert a lifting force between said divider and one of said connecting means tending to straighten the pair of connected partition elements for breaking loose the ice blocks disposed in the adjacent compartments from their compartment walls.

LARRY D. KELLY.